United States Patent [19]

Chan et al.

[11] Patent Number: 5,660,605

[45] Date of Patent: Aug. 26, 1997

[54] WINDOW FAN

[75] Inventors: Thomas Chan, Braintree; Johnson Hsu, Framington, both of Mass.

[73] Assignee: Holmes Products Corp., Milford, Mass.

[21] Appl. No.: 529,340

[22] Filed: Sep. 18, 1995

[51] Int. Cl.$^6$ .................................. B01D 50/00
[52] U.S. Cl. .................. 55/274; 55/328; 55/415; 55/418; 55/471; 55/473; 55/481; 55/506; 55/DIG. 34; 454/202; 454/207
[58] Field of Search .................. 55/274, DIG. 34, 55/467, 471, 472, 473, 481, 506, 320, 323, 324, 328, 418, 415; 454/202, 200, 207; 95/268, 273

[56] References Cited

U.S. PATENT DOCUMENTS

| | | | |
|---|---|---|---|
| 1,916,907 | 7/1933 | Sargent | 55/481 |
| 2,029,406 | 2/1936 | Birkholz | 454/207 |
| 2,081,553 | 5/1937 | Neeson | 55/481 |
| 2,218,330 | 10/1940 | Eliason | 454/207 |
| 2,265,317 | 12/1941 | Schlirf | 454/207 |
| 2,275,564 | 3/1942 | Shawhan et al. | 454/207 |
| 2,296,635 | 9/1942 | Foehrenbach et al. | 454/207 |
| 2,373,497 | 4/1945 | Paiste, Jr. | 454/200 |
| 2,583,555 | 1/1952 | Fields et al. | 454/207 |
| 2,596,801 | 5/1952 | Wihelmi | 454/207 |
| 2,933,151 | 4/1960 | Kurtz | 55/481 |
| 2,992,701 | 7/1961 | White | 55/467 |
| 3,081,690 | 3/1963 | Gesmar | 454/207 |
| 3,209,668 | 10/1965 | Haerter | 55/467 |
| 3,259,053 | 7/1966 | Steel | 55/467 |
| 3,698,308 | 10/1972 | Navara | 434/213 |
| 3,826,182 | 7/1974 | Navara | 454/213 |
| 3,930,818 | 1/1976 | McDougall | 55/467 |
| 3,991,533 | 11/1976 | Nagase | 52/473 |
| 4,042,357 | 8/1977 | Gysi | 55/481 |
| 4,280,332 | 7/1981 | Khan et al. | 55/DIG. 34 |
| 4,736,677 | 4/1988 | Smith | 454/213 |
| 4,872,399 | 10/1989 | Chaney | 454/210 |
| 5,125,239 | 6/1992 | Kobayashi et al. | 55/467 |
| 5,217,513 | 6/1993 | Armbruster | 55/274 |
| 5,253,485 | 10/1993 | Kennedy et al. | 62/262 |
| 5,312,467 | 5/1994 | Wolfe | 55/493 |

FOREIGN PATENT DOCUMENTS 4-4322712  11/1992  Japan .................. 55/467

Primary Examiner—Jay H. Woo
Assistant Examiner—Duane S. Smith
Attorney, Agent, or Firm—Hoffmann & Baron, LLP

[57] ABSTRACT

A window fan incorporating a filter. The fan has a low, flat profile for fitting in a window while occupying limited viewing area of the window. The fan includes laterally projecting extensions for sealing a gap which might otherwise exist at the right and left sides of the fan. The fan includes a motorized squirrel cage blower for forcing air through a flow path defined within the window fan. The blower is elongated, and oriented with its rotational axis arranged horizontally to enable the low profile. The filter is washable, and is installed by sliding into a holding chamber, and located serially within the air flow path. The window fan has a manually adjustable air deflector for directing discharged air as desired. The electrical circuit conducting power to the motor includes a touch sensitive switch for on-off control, a thermostatic switch for operating the fan when the touch switch is on and a predetermined temperature is detected, a speed selector switch, and an indicating lamp.

17 Claims, 3 Drawing Sheets

WINDOW FAN

BACKGROUND OF THE INVENTION

1. Field of the Invention

The present invention relates to a powered window fan having a removable air filter. The fan has a housing into which one or more filter elements are removably inserted.

2. Description of the Prior Art

Within the field of cooling and ventilating of occupied space of buildings, many characteristics are sought. It is generally considered desirable to employ natural light and air. Yet at times it may be desirable to provide filtered air, since natural air may be encumbered with irritants and contaminants, such as pollen, dust, ash, insects, among others. Another requirement which may not be met naturally is that the air must be forced in the absence of wind.

Various devices have been proposed in the prior art to augment ventilation. To assure that ventilation is provided selectively in rooms wherein air circulation is not satisfactory, these devices are typically set in windows. Ventilators which redirect air and control air flow are seen in U.S. Pat. Nos. 3,991,533, issued to Mitsuo Nagase on Nov. 16, 1976, and 4,736,677, issued to Nigel R. Smith on Apr. 12, 1988. These devices control passive air flow through a window, but lack the powered fan and filter of the present invention.

Devices having a filter are set forth in U.S. Pat. Nos. 3,698,308, issued on Oct. 17, 1972, and 3,826,182, issued on Jul. 30, 1974, both to Joseph Navara, and 5,312,467, issued to Michael Wolfe on May 17, 1994. The subject devices of these patents are placed in partially open windows, and filter air flowing therethrough. However, unlike the present invention, these prior art devices lack a powered fan.

A fan assembly specifically designed for placement in a window is shown in U.S. Pat. No. 4,872,399, issued to David B. Chaney on Oct. 10, 1989. This device lacks the filter of the present invention.

A renewable filter for an air distribution duct is shown in U.S. Pat. No. 5,217,513, issued to Joseph M. Armbruster on Jun. 8, 1993. The filter lacks the powered fan of the present invention.

A low profile window air conditioner is shown in U.S. Pat. No. 5,253,485, issued to Robert W. Kennedy et al. on Oct. 19, 1993. By contrast with the present invention, the air conditioner does not draw air into a room from outside the room, and filter this air.

While different aspects of the present invention are shown in various prior art patents, the novel combination is not shown or suggested in these patents.

None of the above inventions and patents, taken either singly or in combination, is seen to describe the instant invention as claimed.

SUMMARY OF THE INVENTION

The present invention provides a window fan assembly which is intended to be placed in a window. The fan assembly forces air into a room from the outside of the room, and filters incoming air. The fan assembly is dimensioned and configured to occupy limited area of the window, so that the user may enjoy a substantially unobstructed view from the window, and may pass light through the window.

The fan assembly is powered by a motor, and has adjustments for controlling airflow capacity and discharge direction. Power is preferably household AC power, and a cord is provided for engagement of a standard household power receptacle. A speed selector switch is provided in the power circuit for selecting motor speed. A separate touch sensitive controller is provided to enable on-off control. When turned on, the motor will operate at the speed selected by the speed selector switch.

The fan assembly has a relatively low profile for fitting into a window while occupying relatively little window area. Viewed from inside the room, the periphery of the fan is rectangular. Extenders project laterally from the fan assembly housing, so that gaps existing to the right and left of the fan assembly housing between the window frame and the fan assembly housing may be sealed.

Internal air deflectors are arranged within the housing for directing discharged air as desired. Selected direction of discharge is adjusted by moving an external lever. Control of air discharge in the right and left lateral directions is provided. Also, exchange of air from within a room to the outside is enabled by a cylindrical deflector which selectively releases air to an intake port or an outlet port.

Accordingly, it is a principal object of the invention to provide a powered window fan which forces filtered air into a room from outside the room.

It is another object of the invention to support the window fan in a window, while minimizing the area of the window occupied by the fan.

It is a further object of the invention to seal the window opening occupied by the fan.

It is an additional object of the invention to adjust air capacity of the fan.

It is again an object of the invention to control the on-off function of the fan by a touch sensitive control.

Another object of the invention is to selectively and manually control the direction of air discharged by the fan in right and left lateral directions.

It is again an object of the invention to direct air from the blower selectively into the room and out of the room.

Yet another object of the invention is to enable filter service from inside the room served by the fan, while maintaining the fan in its position in the window.

Still another object of the invention is to actuate the fan responsive to a predetermined temperature.

Yet a further object of the invention is that the filter be easily accessible, removable from the fan without tools, and washable.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
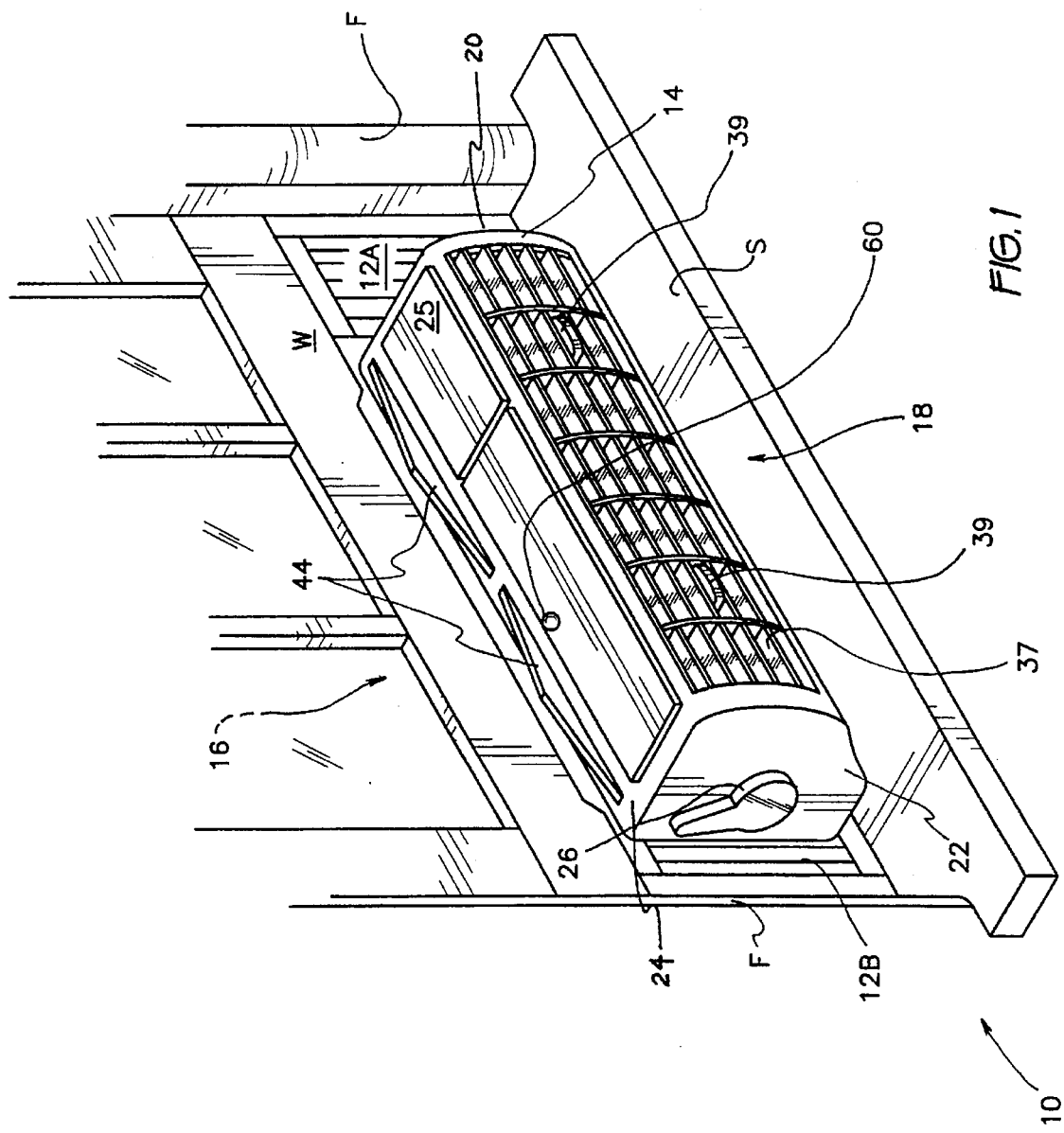
FIG. 1 is an environmental, perspective view of the invention.

As seen in FIG. 1, the novel window fan assembly 10 is an appliance intended for being placed in the window opening of a single or double hung window W, and secured in this position by lowering the 5 window into contact with window fan assembly 10. Window fan assembly 10 is thus clamped in place, resting upon the window sill S or equivalent structure.

Windows exist in many different dimensions. The vertical dimension of window fan assembly 10 is accommodated by raising and lowering window W to suit. The horizontal dimension of the window may exceed that of window fan assembly 10. To seal the gap that would otherwise exist between the sides of the window frame F and window fan assembly 10, two extenders 12A, 12B are provided. Of course, sealing for ventilation purposes need not imply that the extenders are air tight. Rather, they may include screens, air permeable filters, or like apparatus for preventing ingress into the ventilated room of insects and particles.

Extenders 12A, 12B are adjustable length panels equal in height to that of window fan assembly 10. Each extender 12A, 12B projects laterally from window fan assembly 10, supported by the housing 14 of window fan assembly 10. Extenders 12A, 12B slide laterally, or alternatively, expand in accordion fashion. Extenders 12A, 12B are selectively moved or expanded laterally until contacting window frame F.

FIG. 1 shows that the peripheral profile of window fan assembly 10, as determined by height and width dimensions, is rectangular, low and compact. The rectangular configuration is crucial to cooperating with a window for clamping and for sealing the opening of window W. The important characteristic of low, compact profile of window fan assembly 10 is achieved by advantageous layout of the major components. The profile and overall dimensions of window fan assembly 10 are determined by housing 14 and by extenders 12A, 12B. Housing 14 provides structural support for all other components and also determines an internal flow path for air pressurized and forced by the fan.

Window fan assembly 10 has a first surface or face 16 external to the occupied space being ventilated, and a second surface or face 18 located within and exposed to the space being ventilated. Arbitrarily, first face 16 will be termed the front of window fan assembly 10, and second face 18 will be termed the rear thereof.

In typical operation, fresh air is drawn from the outside of the room being ventilated. Air flows from the exterior of the ventilated space through front face 16, and discharged through rear face 18. Fresh air is drawn past filters located on right and left air passageways conducting air from the blower.

The peripheral profile, or periphery, that being the right and left lateral boundaries and upper and lower boundaries, will generally be rectangular in order to conform to standard window openings and frames. The overall geometry, therefore, requires that the first and second faces each be arranged at an angle to the periphery. Both front and rear surfaces, or first and second faces 16, 18, respectively, must have a vertical dimension to provide adequate cross sectional area for accommodating air flow. However, there is no requirement that the actual front and rear faces 16, 18 be either flat and planar, or vertical.

Airflow through a window fan is generally horizontal. That is, air is drawn from one side of the fan, preferably from first face 16, to the other side of the fan. While the actual direction of air intake and discharge may be other than horizontal, and while the airflow path within the fan assembly may be other than horizontal, the overall direction of migration of air is horizontal, entering window fan assembly 10 through the first or front face 16, and being discharged through the second or rear face 18.

Manual controls are located on right and left lateral surfaces and upper, rear surface 20, 22, 24 (respectively) of window fan assembly 10. A lever 26 for adjusting the direction of airflow of discharged air is located on a lateral surface. Motor controls are disposed upon upper, rear surface 24, concealed beneath a hinged cover 25.

Figure 2:
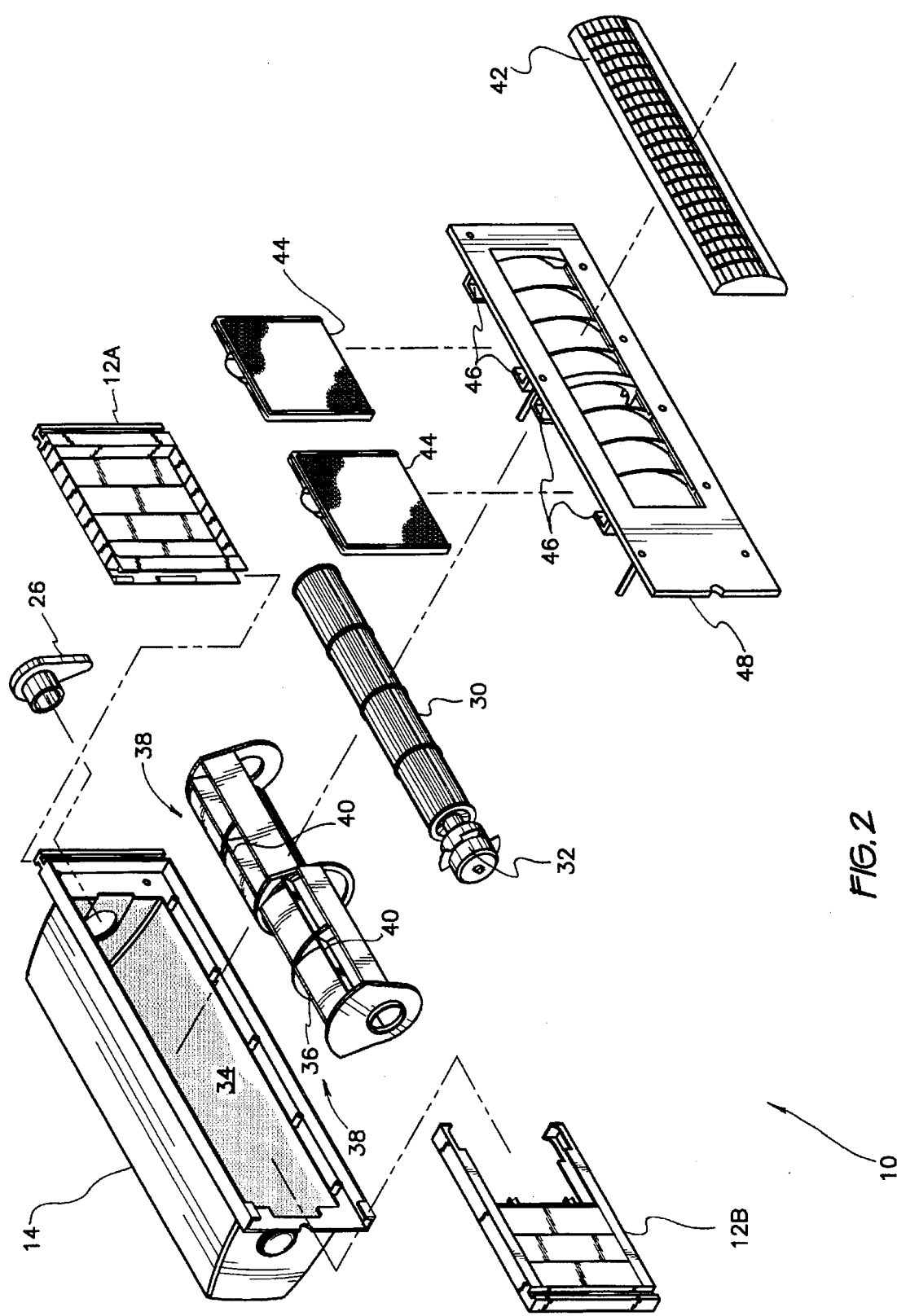
FIG. 2 is a diagrammatic, perspective, exploded view of the invention.

Major components of window fan assembly 10 are shown in FIG. 2. The actual fan is a squirrel cage blower 30 directly driven by an electric motor 32. A squirrel cage blower discharges air radially with respect to its rotational axis. This enables the configuration of the stream of discharged air to conform to the overall flat, low profile of window fan assembly 10. Blower 30 is elongated, in that its axial length is greater than its diameter, thus further assisting in achieving the desired profile. Motor 32 is of the same general overall diameter of blower 30, and due to direct drive, extends axially from blower 30.

Blower 30 occupies a generally arcuate chamber 34 bounded by a generally cylindrical air deflector 36. Deflector 36 has axial slots 38 for discharging air under pressure from blower 30, and support members 40 for supporting the cylindrical wall of deflector 36. Deflector 36 is rotated, controlled by manual lever 26 from outside housing 14. Lever 26 is shown in its operative position in FIG. 1.

Deflector 36 incorporates two independent sections. In one embodiment, one section is fixed or stationary, and the other section is adjustable. Alternatively, the two independent sections are both adjustable, and independent of one another. In the latter embodiment, two levers 26 would be provided, one on the left side of housing 14, and one on the right side.

Having two independent sections offers the further option of discharging air into the room through one adjustable section, and exhausting air to the outside of the room being ventilated through the other adjustable section. Thus, a supply of constantly replenished fresh air circulates throughout the ventilated room.

Further influence over direction of discharged air is exercised by additional louvers 37, controlled by handles 39, (neither shown), which may, if desired, be located in the outlet of the airflow path, such as within rear grille 42.

An important feature of window fan assembly 10 is filtration of incoming air, which may be laden with dust, pollen, and other contaminants. Filtration is accomplished by manually inserted and removed filters 44 which normally occupy chambers or partial chambers defined by grooves 46 formed in a rear panel 48 of housing 14. Grooves 46 provide a track or path for sliding filters 44 into and from a fixed, operative position within the airflow path of window fan assembly 10.

Filters 44 may project outside housing 14 for access, or doors may be provided to conceal filters 44 and other components in order to improve the aesthetics of window fan assembly 10. Grooves 46 defining the chamber surrounding and supporting filters 44 open to rear, upper surface 24 (see FIG. 1) of housing 14, so that filters 44 are accessible without having to disassemble window fan assembly 10 or to remove window fan assembly 10 from the window.

The chamber or partial chamber housing filters 44 is arranged serially within airflow resulting from operating blower 30, such that all air must pass through a filter 44. The filter element is preferably flexible and water resistant, so that filters 44 can be removed and washed. A resilient foam made from a synthetic resin, such as artificial foam rubber, would be a suitable flexible, water resistant material for the filter elements. When cleared of trapped debris and contaminants by washing, filters 44 are reinserted into their operative positions, and thus are reusable.

High performance filters, such as those known as high efficiency particulate arresting (HEPA), may be employed. Absorbent filtration elements, such as charcoal, and electrostatic filters, such as electret type, may be employed.

Figure 3:
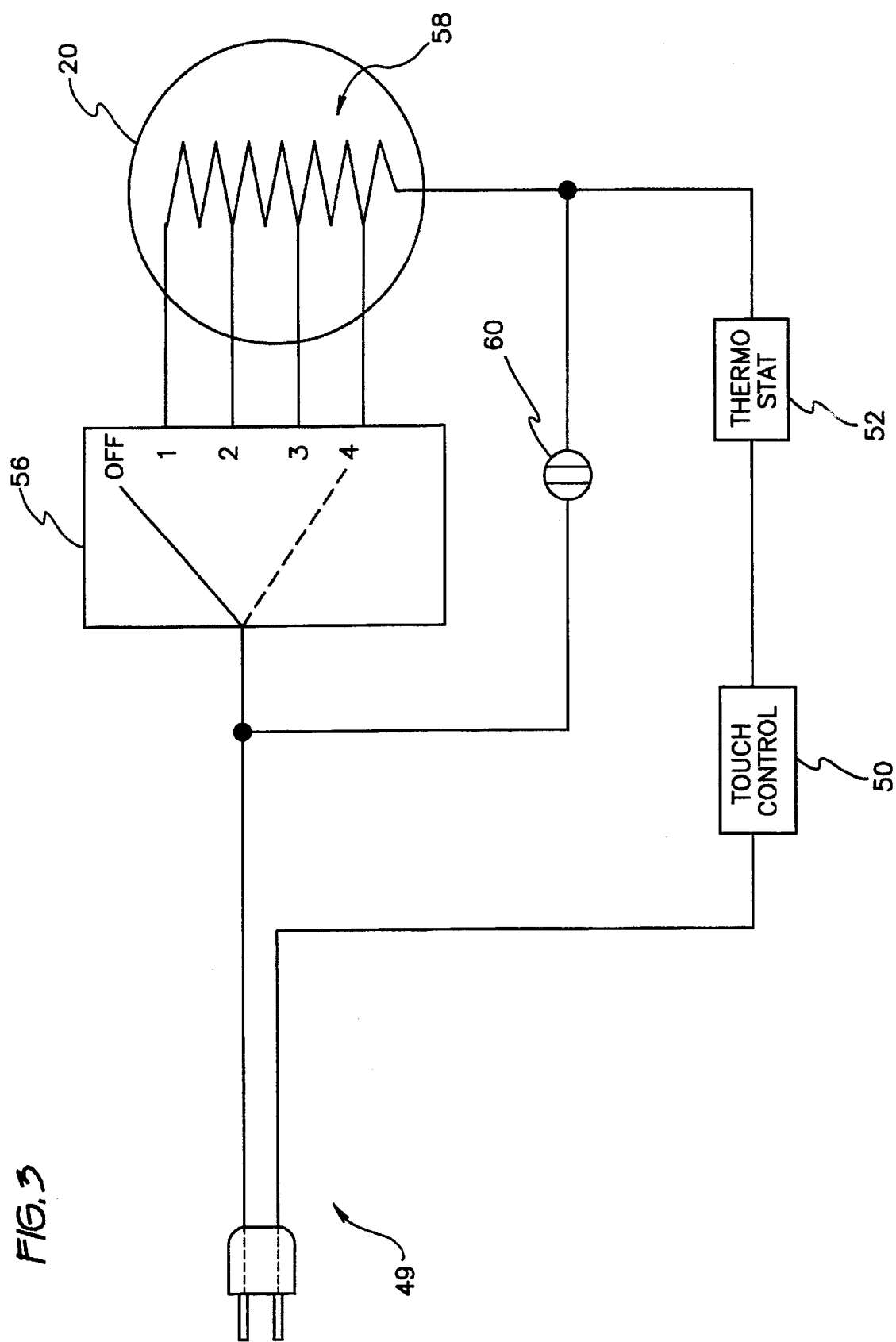
FIG. 3 is a schematic representation of the electrical system of the invention.

FIG. 3 shows a preferred electrical power and control schematic diagram. For connection to household AC power, a cord and plug assembly 49 is provided. A circuit for conducting electrical power to motor 20 directly interrupts power by a touch activated switch 50 and by a temperature responsive switch 52. Switch 50 is a capacitance responsive device which requires that a person touch a designated external surface or touch pad (not shown) of the device. This type of device is a well known application of capacitance, and is employed, for example, to switch lamps on and off. The touch pad is preferably located on upper, rear surface 24 of housing 14.

With switches 50 and 52 arranged in series, motor 20 runs only when a user has closed the circuit by touching switch 50, and when switch 52 is closed responsive to detection of a predetermined temperature.

In addition to the on-off controls described above, a speed control is provided. In the embodiment of the electrical circuit illustrated in FIG. 3, the speed control is a five position switch 56, with an off position and four selectable speeds.

When running, motor 20 will run at the speed selected by switch 56, which in the present case may include the off condition. Motor 20 is representative of a well known eight pole motor, with more or fewer poles (not specifically shown) and windings 58 being selectively energized by switch 56.

An indicator lamp 60 is incorporated into the circuit in order to indicate fan operation. A preferred location on housing of lamp 60 is shown in FIG. 1.

The present invention is susceptible to many variations from and modifications to the embodiments described hereinbefore. For example, the motor may drive the blower indirectly rather than directly, although this would entail additional complexity and cost, and reduced efficiency. The blower and filter each could be formed in any number of sections, including a single elongated structure, or in a number increased from that described. Filters may be mounted directly to the housing, rather than to a front cover component.

Depending upon the principal purpose, the controls and control sequence may be varied. In the embodiments shown, it is contemplated that the invention ventilate a room or space to assist in influencing temperature. Thus, thermostatic control is arranged to override the manual on-off switch. Obviously, a manual on-off function could be arranged in parallel with thermostatic control so that either a user's conscious choice or attainment of a predetermined temperature could actuate the fan, rather than requiring both criteria to be met, as occurs in the circuit of FIG. 3. Likewise, the convenient touch control could be replaced by another type of control, a remote control, or may be omitted from the circuit.

Different speeds could be signalled by additional indicator lamps (not shown).

Speed variation of the fan may be accomplished in ways other than in discrete steps as described above. Depending upon the nature of the electrical source, a variable voltage or variable frequency controller (neither shown) may be furnished for infinite variation of motor speeds.

Utilization of a power source other than household AC power is also possible. A battery (not shown) may be connected or incorporated to provide DC power.

It is to be understood that the present invention is not limited to the embodiments described above, but encompasses any and all embodiments within the scope of the following claims.

We claim:

1. A window fan assembly comprising:

an elongated squirrel cage blower;

a housing supporting and peripherally surrounding said blower and a motor, said housing having a periphery for engaging a window, a first vent communicating an interior space of said housing with outside air, and a second vent communicating the interior space of the housing with inside air, said blower arranged to exchange air from outside said window fan assembly through said first vent and to exchange inside air through said second vent;

a deflector surrounding said blower, said deflector having at least first and second deflector sections, each of said sections selectively positionable with respect to the first and second vents, wherein said first and second deflector sections may be independently positioned to provide air exchange such that one of said first and second deflector sections draws outside air into said blower for discharge into a room and the other of said deflector sections draws inside air into said blower for discharge to the outside; and a filter for filtering air forced by said blower into said room, said filter supported within said housing and arranged serially within airflow resulting from operating said blower.

2. The window fan assembly according to claim 1, said housing having an upper, rear surface and means for providing access to said filter from said upper rear surface, whereby said filter is removed and replaced without requiring removal of said window fan assembly, from a window.

3. The window fan assembly according to claim 2, said means for providing access to said filter comprising grooves providing a fixed, operative position for said filter, and a path for sliding said filter into and from said fixed, operative position.

4. The window fan assembly according to claim 1, further comprising means for adjusting each of said deflector sections to selectively direct discharged air.

5. The window fan assembly according to claim 4, said means for adjusting each of said deflector sections comprising an external control lever attached to each of said deflector sections.

6. The window fan assembly according to claim 4, wherein the adjusting means rotationally adjusts one of said first and second deflector sections independently of the other of said section.

7. The window fan assembly according to claim 4, further comprising means for redirecting air with respect to the direction of discharge from said deflector.

8. The window fan assembly according to claim 1, further comprising electrical circuitry for conducting electrical power to said motor and for controlling said motor, said electrical circuitry including speed control means for selectively varying fan speed.

9. The window fan assembly according to claim 1, further comprising electrical circuitry for conducting electrical power to said motor and for controlling said motor, said electrical circuitry including a temperature responsive switch for energizing said motor responsive to detection of a predetermined temperature.

10. The window fan assembly according to claim 1, further comprising electrical circuitry for conducting electrical power to said motor and for controlling said motor, said electrical circuit including a touch responsive switch opening and closing said circuitry.

11. The window fan assembly according to claim 1, further comprising an extender projecting laterally from and supported by said housing, said extender selectively movable to a position projecting laterally from said housing, whereby a gap existing between said window fan assembly and the frame of a supporting window is sealed.

12. The window fan assembly according to claim 1, further comprising electrical circuitry for conducting electrical power to said motor and for controlling said motor, said electrical circuitry including an indicator responsive to and indicating operation of said motor.

13. The window fan assembly according to claim 1, said blower being oriented horizontally within said housing, whereby said window fan assembly has a flat, compact profile.

14. The window fan assembly according to claim 1, said filter made from a flexible, water resistant material, whereby said filter is washable and reusable.

15. The window fan assembly according to claim 1, said filter comprising an absorbent filtration element.

16. The window fan assembly according to claim 1, said filter comprising an electrostatic filtration element.

17. A window fan assembly comprising:

an elongated squirrel cage blower;

a motor drivably connected to said blower;

a housing supporting and peripherally surrounding said blower and said motor, said housing having a periphery for engaging a window, a first vent communicating an interior space of said housing with outside air, and a second vent communicating the interior space of the housing with inside air; and a deflector surrounding said blower, said deflector having at least first and second deflector sections, each of said deflector sections selectively positionable with respect to the first and second vents wherein said first and second deflector sections may be independently positioned to provide air exchange such that one of said first and second deflector sections draws outside air into said blower for discharge into a room and the other of said deflector sections draws inside air into said blower for discharge to the outside.

* * * * *